: US011781445B2

(12) United States Patent
Shimmyo et al.

(10) Patent No.: US 11,781,445 B2
(45) Date of Patent: Oct. 10, 2023

(54) TURBINE CASING, GAS TURBINE, AND METHOD FOR PREVENTING DEFORMATION OF TURBINE CASING

(71) Applicant: Mitsubishi Power, Ltd., Kanagawa (JP)

(72) Inventors: Tetsuya Shimmyo, Yokohama (JP); Shunsuke Torii, Tokyo (JP); Masanori Yuri, Yokohama (JP); Naoya Tatsumi, Yokohama (JP); Shingo Yamasue, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 101 days.

(21) Appl. No.: 17/420,818

(22) PCT Filed: Mar. 4, 2020

(86) PCT No.: PCT/JP2020/009062
§ 371 (c)(1),
(2) Date: Jul. 6, 2021

(87) PCT Pub. No.: WO2020/195627
PCT Pub. Date: Oct. 1, 2020

(65) Prior Publication Data
US 2022/0090517 A1  Mar. 24, 2022

(30) Foreign Application Priority Data

Mar. 28, 2019  (JP) ................................. 2019-063311

(51) Int. Cl.
*F01D 25/24* (2006.01)
*F01D 25/12* (2006.01)
*F02C 7/18* (2006.01)

(52) U.S. Cl.
CPC ............. *F01D 25/12* (2013.01); *F01D 25/24* (2013.01); *F02C 7/18* (2013.01); *F05D 2220/32* (2013.01);
(Continued)

(58) Field of Classification Search
CPC . F01D 25/12; F01D 25/24; F02C 7/18; F05D 2220/32; F05D 2240/14; F05D 2260/201
(Continued)

(56) References Cited

U.S. PATENT DOCUMENTS 6,065,282 A * 5/2000 Fukue ..................... F02C 7/185
 415/117
7,299,618 B2 * 11/2007 Terazaki ................... F23R 3/26
 60/752

(Continued)

FOREIGN PATENT DOCUMENTS

DE  10 2006 024 968   12/2006
DE  11 2005 001 800   5/2007
(Continued)

OTHER PUBLICATIONS

1st Office Action dated May 28, 2019 in corresponding JP Application No. 2019-063311 with Machine Translation.
(Continued)

*Primary Examiner* — Logan M Kraft
*Assistant Examiner* — Anthony Donald Taylor, Jr.
(74) *Attorney, Agent, or Firm* — Wenderoth, Lind & Ponack, L.L.P.

(57) ABSTRACT

According to an embodiment, a turbine casing comprises a cooling air supply unit configured to supply a cooling air to an interior space of a casing of a gas turbine, and the cooling air supply unit includes: a first supply unit disposed in an upper half of the casing so as to face a first region and configured to supply the cooling air to the first region, where
(Continued)

the first region is a region on a radially outer side of a plurality of combustors arranged annularly around a rotor; and a second supply unit disposed so as to face a second region and configured to supply the cooling air to the second region, where the second region is a region on a radially inner side of the plurality of combustors.

12 Claims, 9 Drawing Sheets

(52) U.S. Cl.
CPC .... *F05D 2240/14* (2013.01); *F05D 2260/201* (2013.01)

(58) Field of Classification Search
USPC .......................................................... 415/116
See application file for complete search history.

(56) References Cited

U.S. PATENT DOCUMENTS

| | | | | |
|---|---|---|---|---|
| 7,708,518 | B2* | 5/2010 | Chehab | F01D 11/24 60/806 |
| 8,973,372 | B2* | 3/2015 | Lee | F02C 6/08 60/785 |
| 9,624,788 | B2* | 4/2017 | Araki | F02C 7/18 |
| 2006/0277915 | A1* | 12/2006 | Iwasaki | F01D 25/12 60/794 |
| 2008/0310949 | A1* | 12/2008 | Kondo | F01D 25/08 415/47 |
| 2011/0154826 | A1 | 6/2011 | Iwasaki et al. | |
| 2011/0154828 | A1 | 6/2011 | Iwasaki et al. | |
| 2013/0251501 | A1 | 9/2013 | Araki et al. | |
| 2014/0123675 | A1 | 5/2014 | Tham et al. | |
| 2014/0301820 | A1 | 10/2014 | Lohse et al. | |
| 2016/0230658 | A1* | 8/2016 | Hanlon | F01D 1/023 |
| 2016/0326878 | A1* | 11/2016 | Morimoto | F01D 11/24 |
| 2017/0234135 | A1* | 8/2017 | Takamura | F02C 7/18 415/116 |
| 2018/0010520 | A1* | 1/2018 | Iwasaki | F01D 5/187 |

FOREIGN PATENT DOCUMENTS

| | | |
|---|---|---|
| DE | 11 2012 006 100 | 1/2015 |
| JP | 2001-289005 | 10/2001 |
| JP | 2003-254010 | 9/2003 |
| JP | 2004-052567 | 2/2004 |
| JP | 2006-037855 | 2/2006 |
| JP | 2006-342784 | 12/2006 |
| JP | 2013-199892 | 10/2013 |
| JP | 2016-500790 | 1/2016 |
| JP | 2016-518544 | 6/2016 |
| WO | 2016/031475 | 3/2016 |

OTHER PUBLICATIONS

2nd Office Action dated Sep. 17, 2019 in corresponding JP Application No. 2019-063311 with Machine Translation.
International Search Report dated May 26, 2020 in International (PCT) Application No. PCT/JP2020/009062.

* cited by examiner

TURBINE CASING, GAS TURBINE, AND METHOD FOR PREVENTING DEFORMATION OF TURBINE CASING

TECHNICAL FIELD

The present disclosure relates to a turbine casing, a gas turbine, and a method for preventing deformation of a turbine casing.

BACKGROUND

A gas turbine includes a compressor for compressing air to produce compressed air, a combustor for mixing the compressed air with fuel and combusting the mixture to produce combustion gas, a rotor rotated by the combustion gas, and a casing accommodating the rotor while allowing the rotor to rotate. In the gas turbine, when the supply of fuel to the combustor is stopped, hot gas stagnates in the casing accommodating the combustor, creating a metal temperature difference between upper and lower parts of the casing. As a result, the upper part of the casing with a higher temperature expands relative to the lower part of the casing with a lower temperature, and the casing deforms like a cat's back, which is so-called cat-back phenomenon.

When the cat-back phenomenon occurs, the gap between the rotor and the stationary body is partially narrowed, and the rotor and the stationary body may come into contact with each other.

Therefore, in order to prevent the cat-back phenomenon, Patent Document 1 proposes a purging device which ejects air into the casing. This purging device is configured to eject overall agitation air for agitating the air held in the upper part of the casing and eject stagnation part agitation air toward the stagnation part of the casing (see Patent Document 1).

CITATION LIST

Patent Literature

Patent Document 1: JP2013-199892A

SUMMARY

Problems to be Solved

However, even in the purging device described in Patent Document 1, the stagnation part in the casing is located in a region radially inward of a plurality of combustors arranged annularly around the rotor, and is separated from a region where the purging device is arranged by the plurality of combustors. Therefore, it cannot be said that the air stagnation part agitation air reaches the stagnant part in the casing, and the effect of suppressing the metal temperature difference between upper and lower parts of the casing may be reduced.

In view of the above, an object of at least one embodiment of the present invention is to prevent deformation of the casing when the operation of the gas turbine is stopped.

Solution to the Problems (1) A turbine casing according to at least one embodiment of the present invention comprises a cooling air supply unit configured to supply a cooling air to an interior space of a casing of a gas turbine. The cooling air supply unit includes: a first supply unit disposed in an upper half of the casing so as to face a first region and configured to supply the cooling air to the first region, where the first region is a region on a radially outer side of a plurality of combustors arranged annularly around a rotor; and a second supply unit disposed so as to face a second region and configured to supply the cooling air to the second region, where the second region is a region on a radially inner side of the plurality of combustors.

With the above configuration (1), in addition to the first supply unit for supplying the cooling air to the first region on the radially outer side of the plurality of combustors, the second supply unit for supplying the cooling air to the second region on the radially inner side is disposed so as to face the second region, so that the cooling air can be sufficiently supplied to the second region, which may not be supplied with the cooling air sufficiently from the first region on the radially outer side of the plurality of combustors. Thus, it is possible to reduce the metal temperature difference between upper and lower parts of the casing and suppress deformation of the turbine casing.

(2) In some embodiments, in the above configuration (1), the casing includes a turning part supported by the casing, formed in an annular shape around the rotor on a radially inner side of the combustors, and divided into a plurality of segments in a circumferential direction. A part of the turning part is disposed so as to face a communication hole of the second supply unit.

With the above configuration (2), the cooling air supplied through the communication hole of the second supply unit impinges on the facing turning part, diffuses in the circumferential direction, agitates and dilutes the space in the stagnation part on the radially inner side of the combustors, and cools the space in the second region of the combustors. As a result, the wall temperature of the turbine casing at an intermediate position in the casing height direction near the space of the second region of the combustors is lowered, and the temperature difference between the casing walls of the upper and lower halves of the turbine casing at the intermediate position in the casing height direction is reduced, so that the deformation of the casing is suppressed.

(3) In some embodiments, in the above configuration (2), the casing includes a cavity part surrounded by the turning part and an inner wall surface of the casing that faces the turning part, and formed in an annular shape extending in the circumferential direction along the turning part.

With the above configuration (3), since the cooling air flows along the cavity part, the space of the stagnation part on the radially inner side of the combustors is agitated and diluted by the cooling air, and the metal temperature difference between upper and lower parts of a conical region at the mid-height of the turbine casing is reduced.

(4) In some embodiments, in any one of the above configurations (1) to (3), the first supply unit includes a plurality of nozzles. Additionally, the first supply unit includes: a top supply unit disposed in the vicinity of a top of the casing; and at least one pair of side supply units adjacent to the top supply unit in the circumferential direction and disposed in a direction away from the top of the casing.

With the above configuration (4), the cooling air can be easily supplied from the first supply unit to a space around the top of the first region in the circumferential direction where hot air tends to accumulate. Thus, it is possible to reduce the metal temperature difference between upper and lower parts of the casing.

(5) In some embodiments, in the above configuration (4), the top supply unit includes one of the plurality of nozzles disposed at the top of the casing, and the at least one pair of side supply units is disposed at circumferentially symmetrical positions about a vertical plane containing a central axis of the rotor.

With the above configuration (5), in the first region, the cooling air is uniformly supplied to the circumferential space around the top, and the casing metal temperature in the first region is equalized in the circumferential direction, so that the metal temperature difference between upper and lower parts of the casing is reduced.

(6) In some embodiments, in the above configuration (4), the top supply unit includes two or more of the plurality of nozzles, and the two or more nozzles are disposed, in the vicinity of the top of the casing, at circumferentially symmetrical positions on both sides of the top about a vertical plane containing a central axis of the rotor.

With the above configuration (6), the atmosphere temperature in the first region is further equalized, so that the metal temperature difference between upper and lower parts of the casing is further reduced.

(7) In some embodiments, in any one of the above configurations (4) to (6), the first supply unit includes a first associated pipe for supplying the cooling air to the plurality of nozzles. The first associated pipe includes: a first orifice defining a supply amount of the cooling air supplied to the top supply unit and disposed upstream of the top supply unit; and a second orifice defining a supply amount of the cooling air supplied to each side supply unit and disposed upstream of each side supply unit. A total value of an opening area or a diameter of the first orifice is smaller than a total value of an opening area or a diameter of the second orifice.

With the above configuration (7), the supercooling of the casing wall temperature in the vicinity of the top is suppressed, so that the casing wall temperature distribution in the circumferential direction in the first region is further flattened. As a result, it is possible to reduce the metal temperature difference between upper and lower parts of the casing wall.

(8) In some embodiments, in the above configuration (7), the second supply unit includes: a communication hole formed in the casing in the second region; a second associated pipe fixed to the casing and connected to the communication hole; and a third orifice defining a supply amount of the cooling air supplied to the second supply unit and disposed upstream of the second associated pipe. A total value of an opening area or a diameter of the third orifice is larger than a total value of an opening area or a diameter of the first orifice and the second orifice.

With the above configuration (8), the atmosphere temperature in the second region is equalized in the circumferential direction, so that the metal temperature difference in the conical region at the mid-height of the casing is equalized. As a result, the metal temperature difference between the upper and lower halves of the casing in the conical region is reduced, and the cat-back phenomenon is suppressed.

(9) In some embodiments, in the above configuration (8), the communication hole is a pair of communication holes disposed at circumferentially symmetrical positions about a vertical plane containing a central axis of the rotor.

With the above configuration (9), since the plurality of communication holes are provided, the circumferential diffusion of ambient air in the cavity part forming the second region is increased, and the metal temperature difference between the upper and lower halves of the casing in the conical region is reduced.

(10) In some embodiments, in any one of the above configurations (1) to (3), the second supply unit is disposed in an angular range of ±20 degrees in the circumferential direction with respect to a vertical plane containing a central axis of the rotor.

With the above configuration (10), the cooling air can be easily supplied from the second supply unit to an upper area of the second region where hot air tends to accumulate. Thus, it is possible to efficiently reduce the metal temperature difference between upper and lower parts of the casing.

(11) In some embodiments, in any one of the above configurations (2) to (10), the turning part is an outer wall surface that forms a manifold for supplying the cooling air to the rotor.

With the above configuration (11), the cooling air can be supplied to a wide area of the second region by using the outer wall surface that forms a manifold for supplying the cooling air to the rotor.

(12) In some embodiments, in any one of the above configurations (4) to (11), two or more nozzles of the side supply units are disposed in an angular range of ±90 degrees in the circumferential direction with respect to the vertical plane containing the central axis of the rotor.

With the above configuration (12), the cooling air can be efficiently supplied to the entire first region by adjusting the arrangement of the first supply unit.

(13) In some embodiments, in any one of the above configurations (4) to (9) or (12), the top supply unit or each side supply unit has a cylindrical nozzle body. The nozzle body has a plurality of openings, along a circumferential direction of the nozzle body on a side of the nozzle body, connecting the inside of the nozzle body and the first region.

With the above configuration (13), the cooling air can be supplied to a wide area of the first region by the nozzle of a simple structure.

(14) A gas turbine according to at least one embodiment of the present invention comprises: the rotor; the plurality of combustors; and the turbine casing in any one of the above configurations (1) to (13).

With the above configuration (14), since the cooling air supply unit having any one of the above configurations (1) to (13) is included, it is possible to reduce the metal temperature difference between upper and lower parts of the casing and suppress deformation of the casing.

(15) A method for preventing deformation of a turbine casing according to at least one embodiment of the present invention comprises: a step of stopping operation of the gas turbine; and a step of supplying a cooling air from a cooling air supply unit disposed in an upper half of the casing to an interior space of the casing. The step of supplying the cooling air includes: a step of supplying the cooling air from a first supply unit disposed so as to face a first region of the interior space to the first region, where the first region is a region on a radially outer side of a plurality of combustors arranged annularly around a rotor in the casing; and a step of supplying the cooling air from a second supply unit disposed so as to face a second region of the interior space to the second region, where the second region is a region on a radially inner side of the plurality of combustors.

With the above method (15), since the cooling air is supplied from the second supply unit disposed so as to face the second region on the radially inner side of the plurality of combustors to the second region, the cooling air can be sufficiently supplied to the second region, which may not be supplied with the cooling air sufficiently from the first region on the radially outer side of the plurality of combustors. Thus, it is possible to reduce the metal temperature difference between upper and lower parts of the casing and suppress deformation of the casing.

(16) In some embodiments, the above method (15) further comprises: a step of adjusting a flow distribution of the cooling air of the first supply unit; and a step of adjusting a flow distribution of the cooling air of the second supply unit.

With the above method (16), the flow distribution of the cooling air supplied from the first supply unit to the first region and the cooling air supplied from the second supply unit to the second region is adjusted, so that the metal temperature difference between the upper and lower halves of the casing can be reduced.

(17) In some embodiments, in the above method (16), the first supply unit includes a top supply unit having a first orifice and a side supply unit having a second orifice. The step of adjusting the flow distribution of the cooling air of the first supply unit includes: a step of measuring a metal temperature of the casing facing the first region; a step of determining a temperature distribution in a circumferential direction of the casing facing the first region from a measurement value of the metal temperature; and a step of, if the temperature distribution is determined to be out of tolerance, replacing at least any of the first orifice or the second orifice or all of the first orifice and the second orifice with an orifice of a different diameter or a different opening area.

With the above method (17), the casing metal temperature facing the first region is equalized in the circumferential direction, so that the metal temperature difference between upper and lower parts of the casing is reduced.

(18) In some embodiments, in the above method (17), the second supply unit includes a second associated pipe having a third orifice. The step of adjusting the flow distribution of the cooling air of the second supply unit includes: a step of measuring a metal temperature of an intermediate casing facing the second region and a metal temperature of a lower half of the casing on an opposite side in a vertical direction to the intermediate casing with respect to a central axis of the rotor; a step of determining a temperature distribution of an upper part and a lower part of the intermediate casing from a measurement value of the metal temperature; and a step of, if the temperature distribution is determined to be out of tolerance, replacing at least any of the first orifice, the second orifice, or the third orifice or all of the first orifice, the second orifice, and the third orifice with an orifice of a different diameter or a different opening area.

With the above method (18), the temperature of the ambient air in the second region supplied with the cooling air from the second supply unit is equalized in the circumferential direction, so that the metal temperature difference between upper and lower parts in the conical region is reduced.

(19) In some embodiments, in any one of the above methods (16) to (18), the step of supplying the cooling air to the second region includes supplying the cooling air to the second region in an amount more than that of the cooling air supplied to the first region.

As described above, in order to reduce the metal temperature difference between upper and lower parts of the casing, more cooling air should be supplied to the second region than to the first region. Therefore, with the above method (19), it is possible to effectively reduce the metal temperature difference between upper and lower parts of the casing.

(20) In some embodiments, in any one of the above methods (16) to (19), the first supply unit includes: a top supply unit disposed in the vicinity of a top of the casing; and at least one pair of side supply units adjacent to the top supply unit in the circumferential direction and disposed in a direction away from the top of the casing. The step of supplying the cooling air from the first supply unit to the first region includes supplying the cooling air to the side supply units of the first supply unit in an amount more than a total supply amount of the cooling air supplied to the top supply unit of the first supply unit.

With the above method (20), the supercooling of the casing in the vicinity of the top of the casing is avoided, so that the casing metal temperature facing the first region is further equalized.

Advantageous Effects

According to at least one embodiment of the present invention, it is possible to prevent deformation of the casing when the operation of the gas turbine is stopped.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
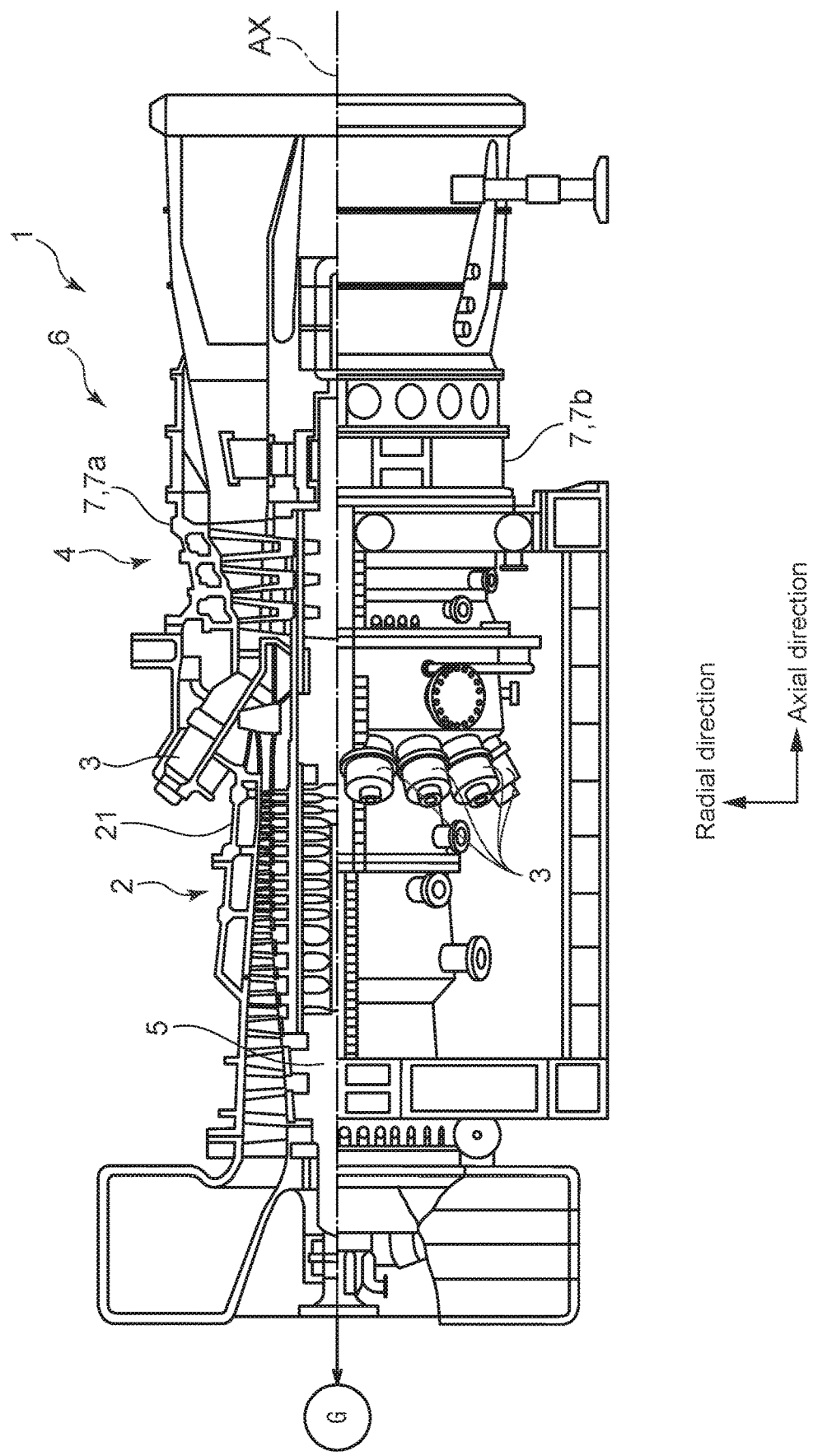
FIG. 1 is a schematic configuration diagram of a gas turbine according to an embodiment of the present invention.

FIG. 1 is a schematic configuration diagram of a gas turbine according to an embodiment of the present invention.

Figure 2:
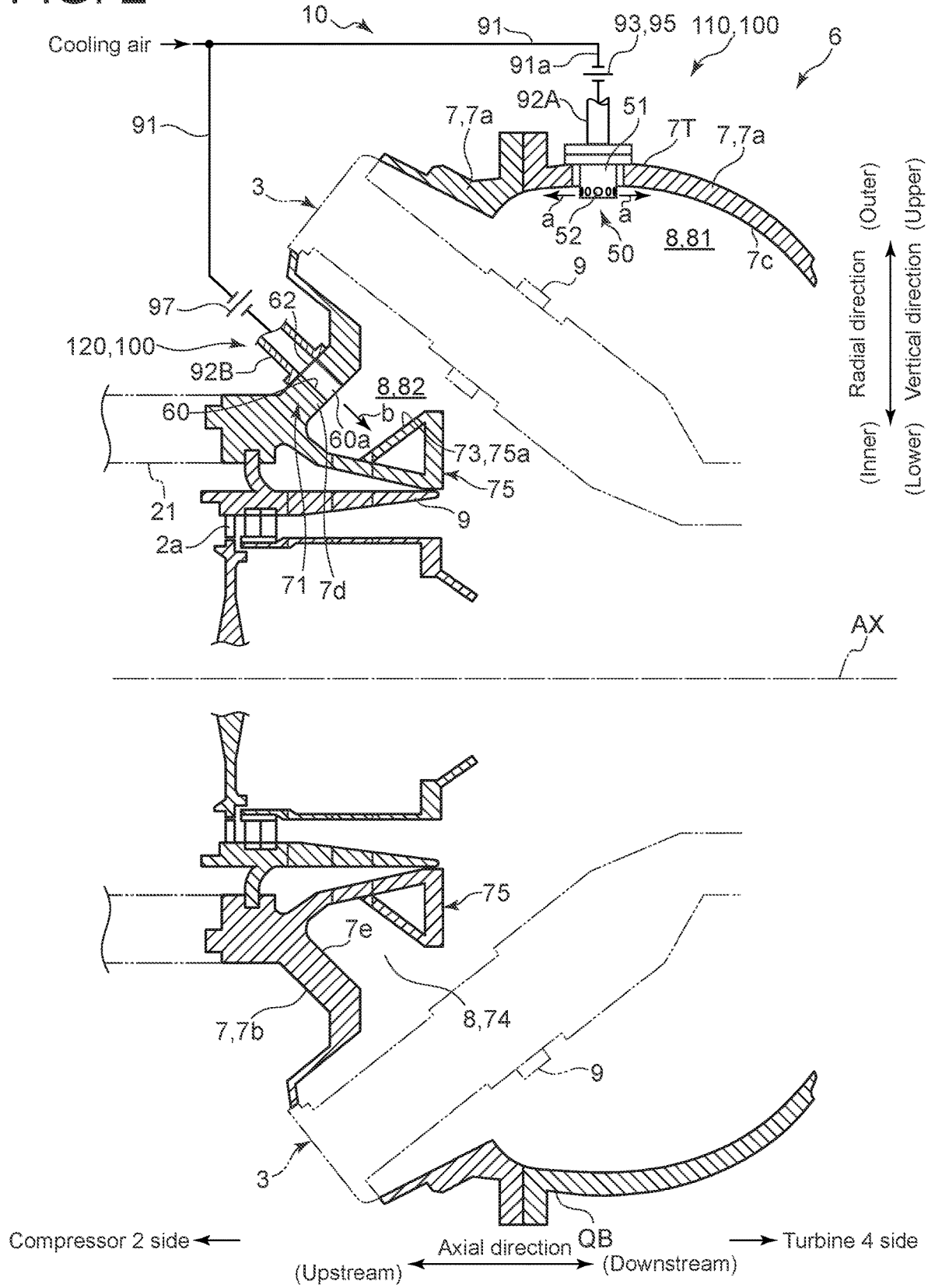
FIG. 2 is a diagram for illustrating the configuration in the vicinity of a combustor of a gas turbine.

FIG. 2 is a diagram for illustrating the configuration in the vicinity of a combustor of a gas turbine.

Figure 3:
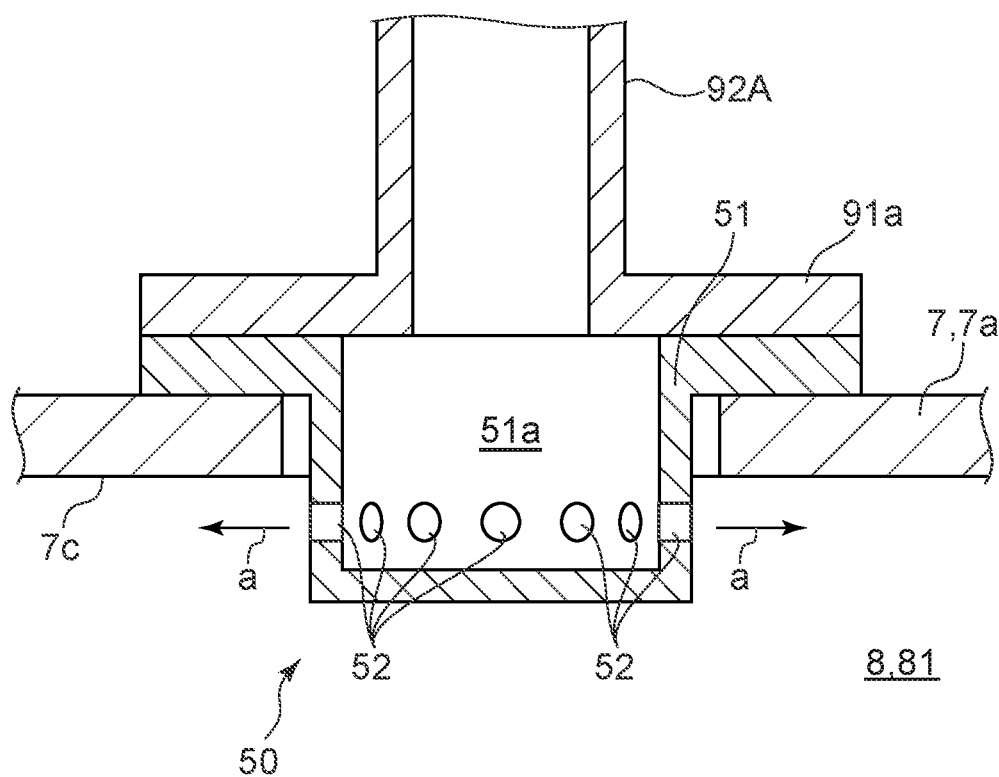
FIG. 3 is a schematic cross-sectional view of a nozzle according to an embodiment in a first supply unit according to some embodiments, taken along the axial direction of the nozzle, for illustrating the configuration of the nozzle.

FIG. 3 is a schematic cross-sectional view of a nozzle according to an embodiment in a first supply unit according to some embodiments, taken along the axial direction of the nozzle, for illustrating the configuration of the nozzle.

Figure 4:
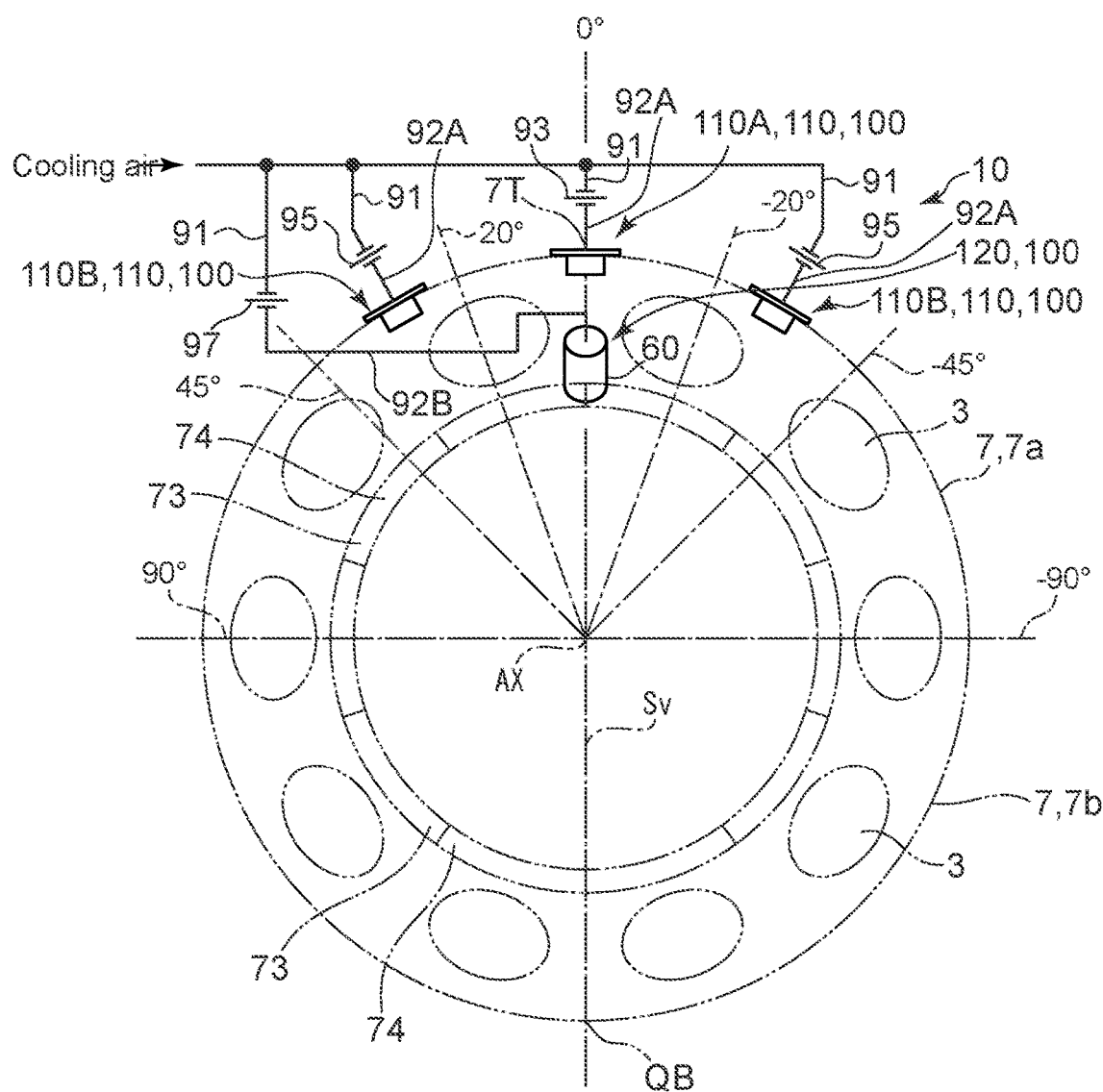
FIG. 4 is a schematic diagram of an area in the vicinity of a combustor viewed from the compressor side to the turbine side, for illustrating an embodiment of the arrangement of a first supply unit and a second supply unit.

FIG. 4 is a schematic diagram of an area in the vicinity of a later-described combustor viewed from the compressor side to the turbine side, for illustrating an embodiment of the arrangement of a first supply unit and a second supply unit.

Figure 5:
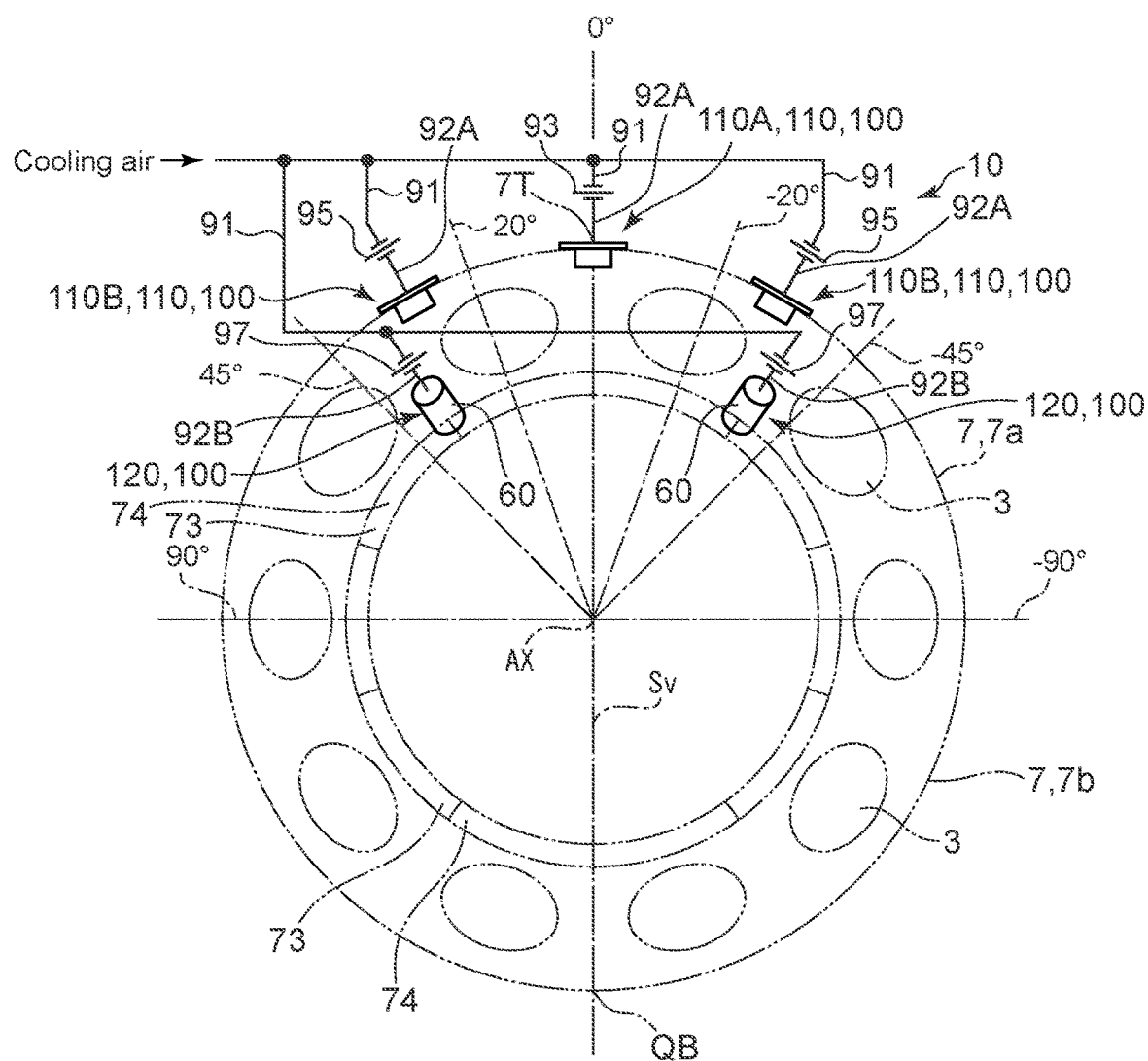
FIG. 5 is a schematic diagram of an area in the vicinity of a combustor viewed from the compressor side to the turbine side, for illustrating another embodiment of the arrangement of a first supply unit and a second supply unit.

FIG. 5 is a schematic diagram of an area in the vicinity of a combustor viewed from the compressor side to the turbine side, for illustrating another embodiment of the arrangement of a first supply unit and a second supply unit.

Figure 6:
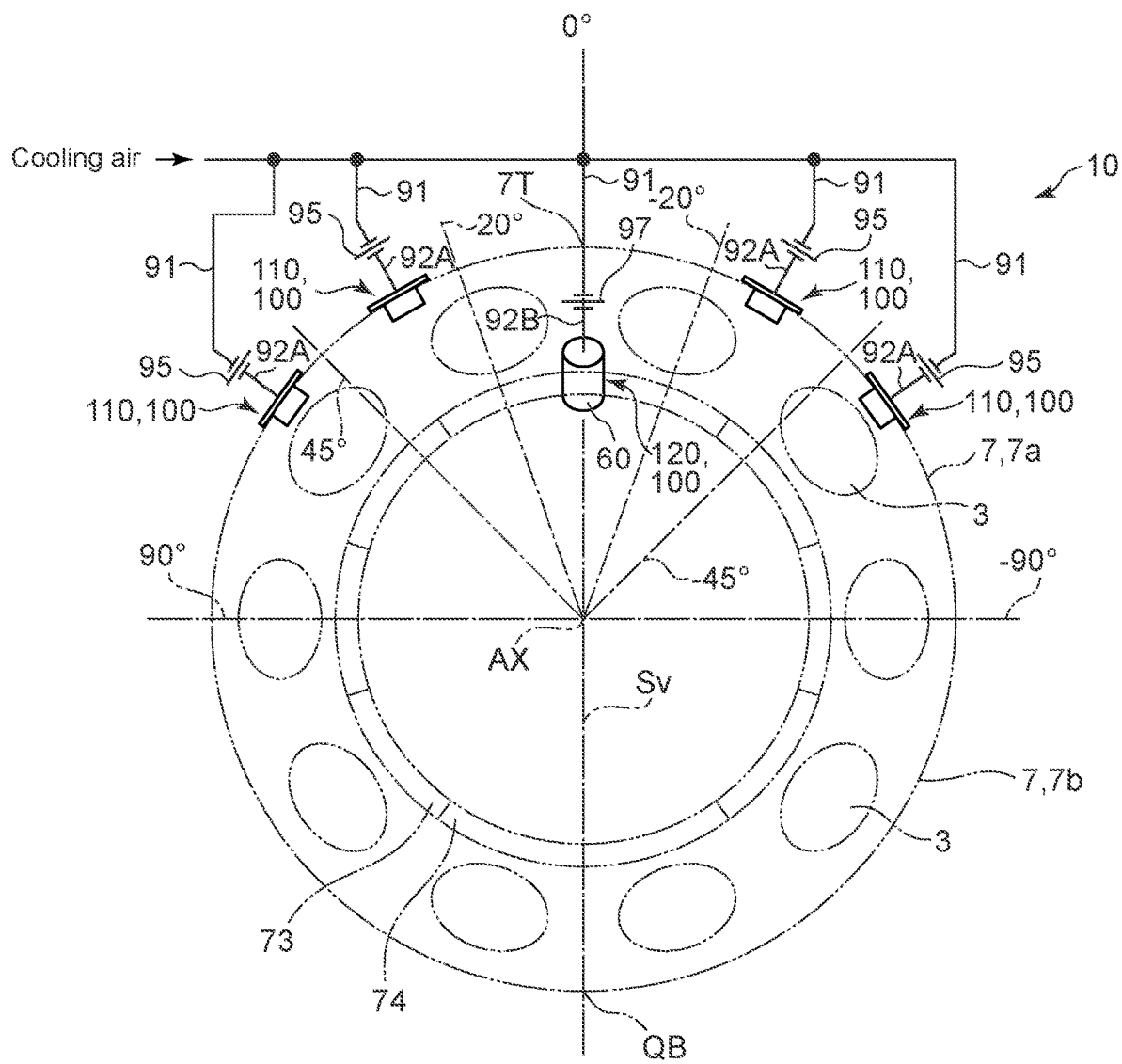
FIG. 6 is a schematic diagram of an area in the vicinity of a combustor viewed from the compressor side to the turbine side, for illustrating still another embodiment of the arrangement of a first supply unit and a second supply unit.

FIG. 6 is a schematic diagram of an area in the vicinity of a combustor viewed from the compressor side to the turbine side, for illustrating still another embodiment of the arrangement of a first supply unit and a second supply unit.

Figure 7:
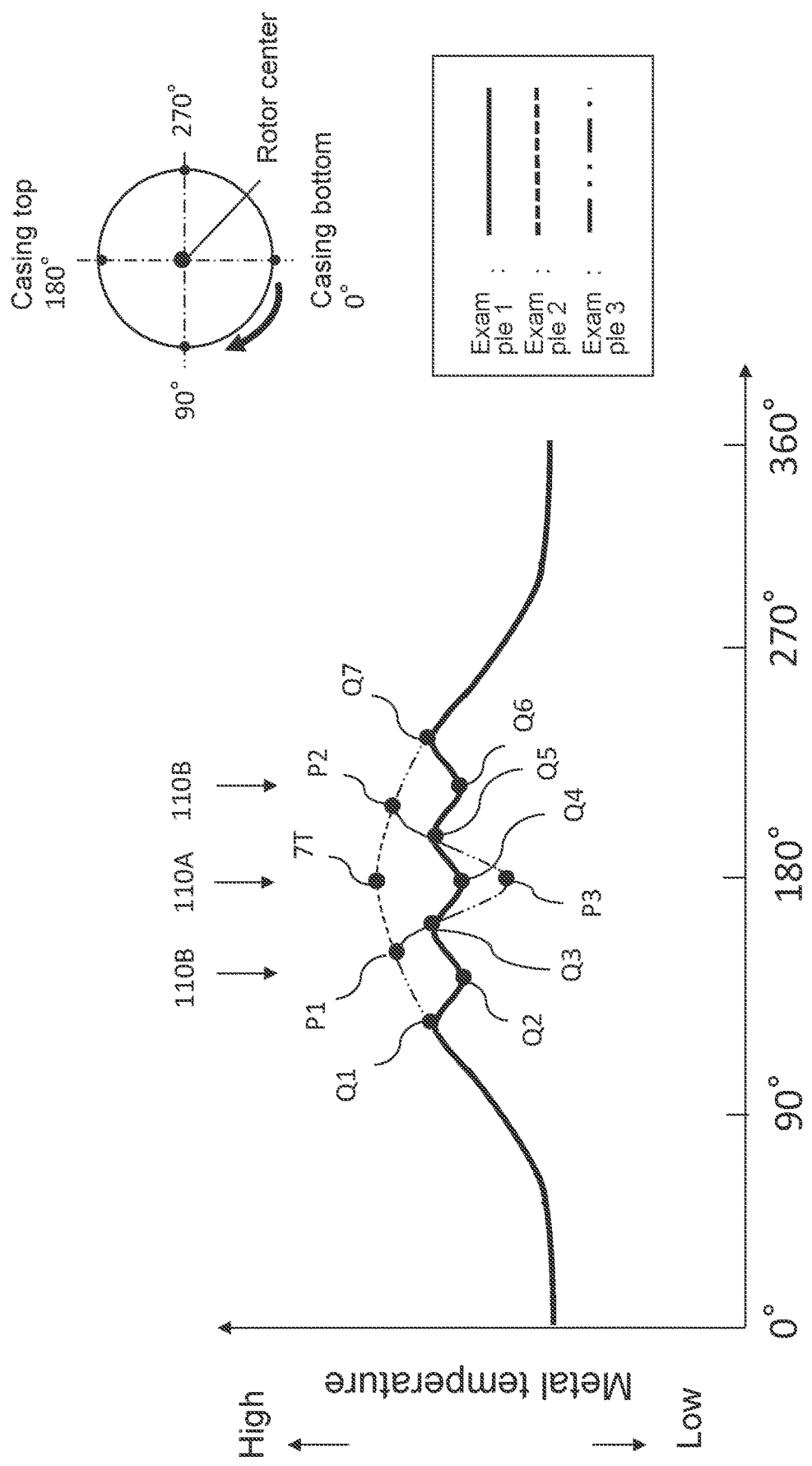
FIG. 7 is a diagram showing the distribution of metal temperature of a casing according to an embodiment.

FIG. 7 is a diagram showing the distribution of metal temperature of a casing according to an embodiment.

Figure 8:
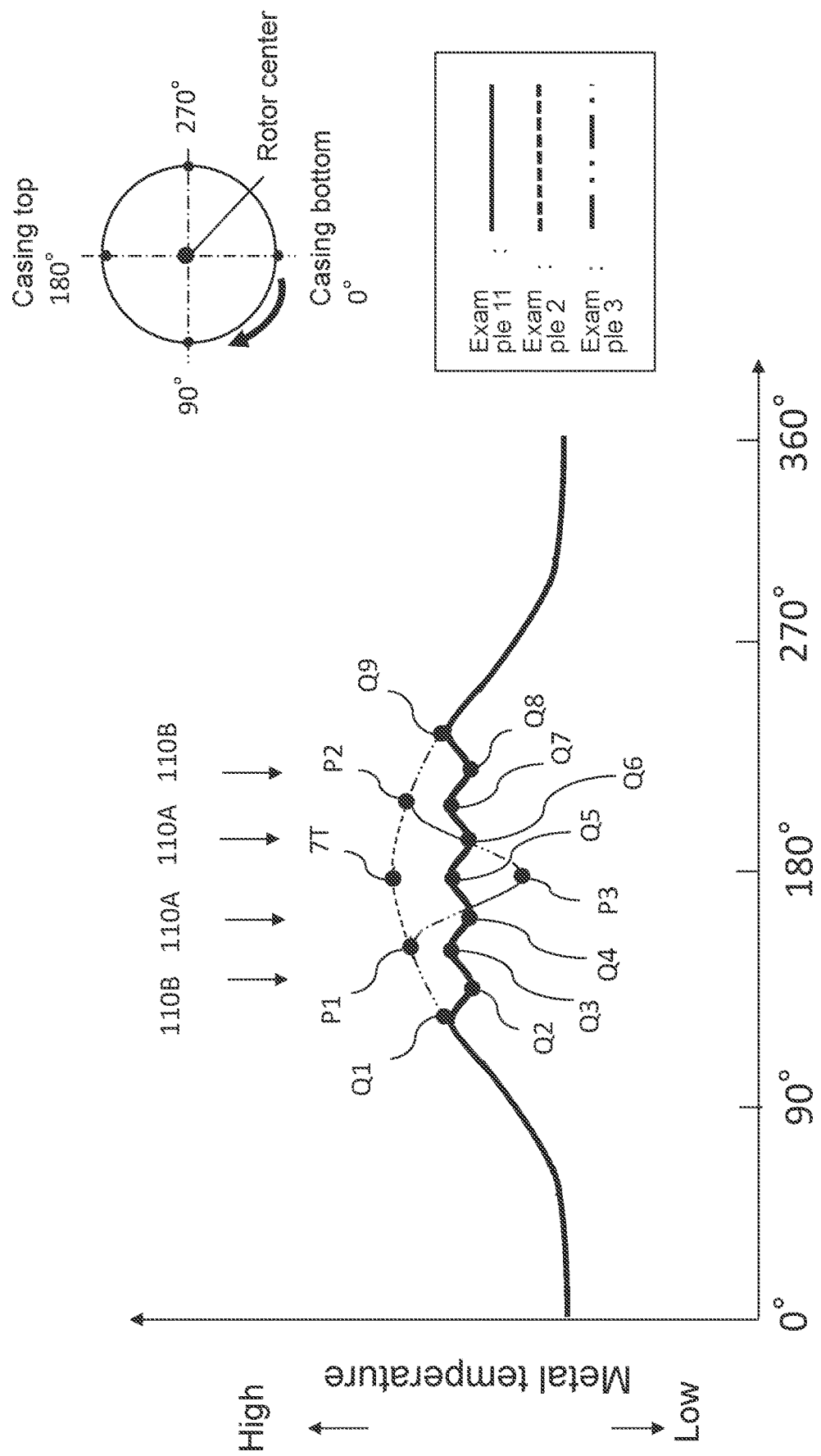
FIG. 8 is a diagram showing the distribution of metal temperature of a casing according to another embodiment.

FIG. 8 is a diagram showing the distribution of metal temperature of a casing according to another embodiment.

Figure 9:
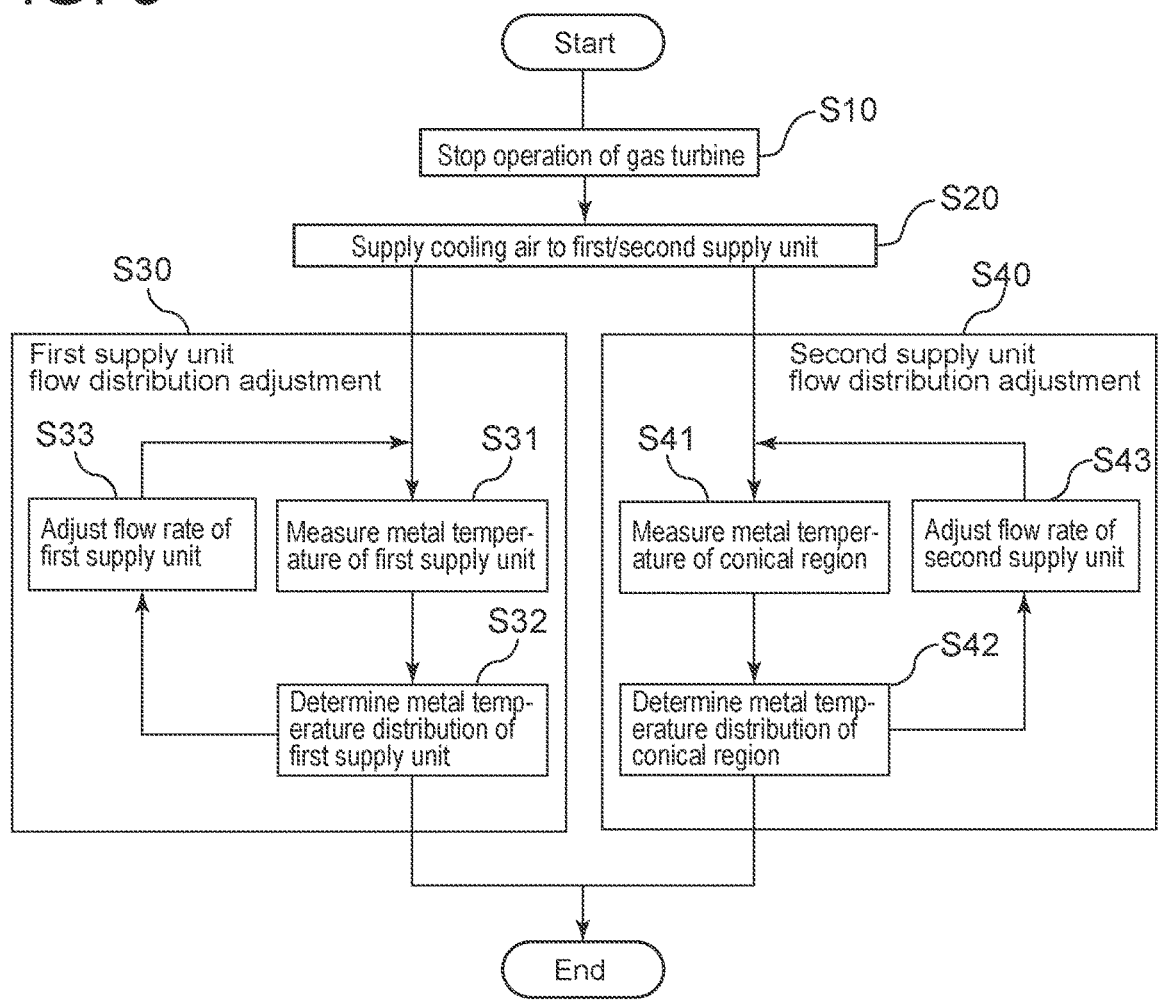
FIG. 9 is a flowchart showing the process of a method for preventing deformation of a casing according to an embodiment.

FIG. 9 is a flowchart showing the process of a method for preventing deformation of a casing according to an embodiment.

As shown in FIG. 1, a gas turbine 1 according to an embodiment of the present invention includes a compressor 2, a combustor 3, and a turbine 4, and is driven by an external device such as a generator G. In the case of the gas turbine 1 for power generation, a rotor 5 is connected to the generator G.

The compressor 2 sucks and compresses the ambient air, the atmosphere, and supplies the compressed air to one or more combustors 3.

In the gas turbine 1 according to an embodiment, a turbine casing 6 of the gas turbine 1 is divided in a horizontal plane containing the central axis AX of the rotor 5. A casing 7 which forms the body of the turbine casing 6 is divided in a horizontal plane into two segments, including an upper half 7a of the casing 7 above the horizontal plane and a lower half 7b of the casing 7 below the horizontal plane. The axially upstream side of the turbine casing 6 is connected to a compressor casing 21 of the compressor 2, and the axially downstream side is connected to the turbine 4. At the outlet of the compressor 2, a diffuser 9 is formed annularly around the rotor 5, and the outlet of the diffuser 9 opens to the turbine casing 6.

The combustor 3 produces a hot gas (combustion gas) by combusting fuel supplied from the outside using the air compressed by the compressor 2. In the gas turbine 1 according to an embodiment, a plurality of combustors 3 are arranged around the rotor 5.

The turbine 4 receives the hot combustion gas produced by the combustor 3 to generate a rotational driving force, and outputs the generated rotational driving force to the compressor 2 and the external device.

As shown in FIG. 2, the casing 7 has an interior space 8 as the installation space for the combustor 3. The interior space 8 is positioned between the outlet of the compressor 2 on the axially upstream side and the inlet of the turbine 4 on the axially downstream side. The combustor 3 is disposed in the interior space 8, and the compressed air is introduced into the combustor 3 from one end of the combustor 3. On the other hand, fuel is supplied to the combustor 3 and mixed with the air to produce a hot combustion gas, which rotationally drives the turbine 4 on the downstream side.

When the operation of the gas turbine 1 is stopped and the supply of fuel to the combustor 3 is stopped, the hot gas stagnates in the casing 7, i.e., the interior space 8 accommodating the combustor 3, creating a metal temperature difference between upper and lower parts of the casing 7. As a result, the upper part of the casing 7 with a higher temperature expands relative to the lower part of the casing 7 with a lower temperature, and the casing 7 deforms like a cat's back, which is so-called cat-back phenomenon.

When the cat-back phenomenon occurs, the gap between the rotor 5 and the stationary body is partially narrowed, and the rotor 5 and the stationary body may come into contact with each other.

Therefore, in the gas turbine 1 according to an embodiment, in order to prevent the cat-back phenomenon, as described later, the turbine casing 6 is provided with a cooling air supply unit 100 for supplying the cooling air.

As shown in FIGS. 2 and 4 to 6, the turbine casing 6 according to some embodiments includes a plurality of cooling air supply units 100 for supplying the cooling air in a region of the interior space 8 of the casing 7 vertically above the rotor 5 in the upper half 7a of the casing 7.

As shown in FIGS. 2 and 4 to 6, the plurality of cooling air supply units 100 according to some embodiments includes a first supply unit 110 for supplying the cooling air to a first region 81 and a second supply unit 120 for supplying the cooling air to a second region 82, which will be described below.

As shown in FIGS. 2 and 3, the first supply unit 110 is disposed so as to face a first region 81 of the interior space 8 of the turbine casing 6 on the radially outer side of the plurality of combustors 3 arranged annularly around the rotor 5. In other words, the first supply unit 110 is arranged to supply the cooling air to the first region 81 on the radially outer side of the plurality of combustors 3 arranged annularly around the rotor 5 and on the vertically upper side.

The first supply unit 110 will be described later in detail.

As shown in FIG. 2, the second supply unit 120 is disposed so as to face a second region 82 of the interior space 8 of the turbine casing 6 on the radially inner side of the plurality of combustors 3 and on the axially upstream of the first region 81. The second supply unit 120 is configured to supply the cooling air to the second region 82 on the radially inner side of the plurality of combustors 3 arranged annularly around the rotor 5.

The second supply unit 120 will be described later in detail.

As shown in FIGS. 2 and 4 to 6, each first supply unit 110 and each second supply unit 120 are supplied with the cooling air via an air supply pipe 91 from an air supply source (not shown), for example. The air supply source may be a blower (not shown) dedicated for blowing the cooling air, or a compressor (not shown) for generating utility air for a plant where the gas turbine 1 is installed.

The second region 82 is separated from the first region 81 by the plurality of combustors 3 arranged annularly around the rotor 5. Therefore, depending on the arrangement of the combustors 3, it may be difficult to supply the cooling air to the second region 82 from the first supply unit 110, which is disposed so as to face the first region 81.

In this regard, as shown in FIG. 2, in the turbine casing 6 according to some embodiments, since the second supply unit 120 for supplying the cooling air to the second region 82 is disposed in the upper half 7a of the casing 7 facing the second region 82, the cooling air can be sufficiently supplied to the second region 82, which may not be supplied with the cooling air sufficiently from the first region 81. Thus, it is possible to reduce the metal temperature difference of the casing 7 between vertically upper and lower parts in the turbine casing 6 and suppress deformation of the casing 7.

First Supply Unit 110

The first supply unit 110 according to some embodiments shown in FIGS. 2 and 4 to 6 includes a top supply unit 110A disposed in the vicinity of the top 7T of the casing 7 and a side supply unit 110B disposed in a direction away from the top 7T in the circumferential direction with respect to the top supply unit 110A.

As shown in FIG. 3, the first supply unit 110 includes a nozzle 50 according to an embodiment. As described below, the nozzle 50 according to an embodiment is configured to jet the cooling air in multiple directions along the inner peripheral surface 7c of the casing 7.

This allows the cooling air to be supplied to a wide area of the first region 81 to reduce the metal temperature difference in the first region 81, thus equalizing the metal temperature distribution on the inner peripheral surface 7c of the casing 7 in contact with the first region 81.

Specifically, the nozzle 50 according to an embodiment shown in FIG. 3 has a nozzle body 51 of cylindrical shape. The nozzle body 51 has a plurality of openings 52, along the circumferential direction of the nozzle body 51 on the side of the nozzle body 51, connecting the inside 51a of the nozzle body 51 and the first region 81.

The nozzle 50 according to an embodiment may be connected to a first associated pipe 92A for supplying the cooling air to the nozzle 50. As shown by the arrow a in FIGS. 2 and 3, the cooling air supplied from the air supply pipe 91 to the nozzle 50 via the first associated pipe 92A is jetted radially to the radially outer side of the nozzle body 51 from the plurality of openings 52 of the nozzle body 51.

The openings 52 are formed in the nozzle body 51 slightly inward of the inner peripheral surface 7c of the casing 7 in the radial direction of the rotor 5. Accordingly, the cooling air jetted from the openings 52 flows along the inner peripheral surface 7c of the casing 7 and agitates and dilutes the ambient air in the casing 7. As a result, the temperature distribution of the ambient air is equalized.

Thus, in the top supply unit 110A and the side supply unit 110B of the first supply unit 110 according to some embodiments, the nozzle 50 with a simple structure, such as the nozzle 50 according to this embodiment, supplies the cooling air to a wide area of the first region 81, so that the temperature distribution of the ambient air around the first supply unit 110 in the first region 81 is flattened.

Second Supply Unit 120

The second supply unit 120 according to some embodiments shown in FIGS. 2 and 4 to 6 includes a communication hole 60 formed in the upper half 7a of the casing 7 and connecting the outside of the casing 7 and the second region 82. Further, the second supply unit 120 is configured to jet the cooling air to the second region 82 through the communication hole 60.

Specifically, in a conical region 71 described later, the communication hole 60 is formed in the inner peripheral surface 7d of the casing 7 so as to extend along the thickness direction of the conical region 71 (the center direction of the rotor 5 of the casing 7). The casing 7 having the communication hole 60 is connected to a second associated pipe 92B for supplying the cooling air.

This eliminates the provision of other parts such as a nozzle to the communication hole 60 connecting the outside of the casing 7 and the second region 82, allowing the supply of the cooling air to the second region 82 with a simple configuration.

The arrangement of the second supply unit 120 when the cooling air is supplied to the second region 82 from outside the gas turbine 1 through the second supply unit 120 will be described.

Generally, as shown in FIG. 2, the gas turbine 1 is connected to the compressor casing 21 of the compressor 2 at the upstream end in the axial direction of the rotor 5. The casing 7 has a region of conical shape (hereinafter, referred to as conical region) formed annularly around the rotor 5 such that the diameter of the casing 7 increases toward the turbine 4, from the axially upstream end of the turbine casing 6 to the axially downstream position where the combustors 3 are arranged.

For arranging the second supply unit 120 so as to face the second region 82, it is desirable to arrange the second supply unit 120 in the conical region 71. Specifically, the inner peripheral surface 7d of the upper half 7a and the inner peripheral surface 7e of the lower half 7b of the casing 7 in the conical region 71 have an inclination in the upper right diagonal or lower right diagonal direction in FIG. 2, i.e., an inclination that extends outward in the radial direction as it goes downstream in the axial direction.

As shown in FIG. 2, the second supply unit 120 shown in FIGS. 2 and 4 to 6 is configured to jet the cooling air toward a turning part 73 extending along the circumferential direction of the rotor 5 on the radially inner side, which is below the combustors 3 when viewed from the second supply unit 120.

In an embodiment shown in FIG. 2, the turning part 73 is an outer wall surface 75a that forms a manifold 75 for supplying the cooling air to the rotor 5. The manifold 75 is formed annularly along the circumferential direction of the rotor 5.

Specifically, as shown in FIGS. 2 and 4 to 6, the turning part 73 is disposed on the axially upstream side of the turbine casing 6 in a space between the combustor 3 and the diffuser 9 through which the compressed air discharged from a last-stage blade 2a of the compressor 2 flows. The turning part 73 is supported by the casing 7 and disposed annularly around the rotor 5. The turning part 73 is a set of multiple block-shaped members, arranged around the rotor 5 without a gap in the circumferential direction. In other words, the turning part 73 is divided into a plurality of segments in the circumferential direction. A part of the turning part 73 is arranged so as to face the communication hole 60 of the second supply unit 120.

A space surrounded by the turning part 73 and the inner peripheral surface 7d of the casing 7 that faces the turning part 73 in the radial direction and extending in the circumferential direction forms a cavity part 74 formed annularly around the rotor 5. The cavity part 74 extends in the circumferential direction along the turning part 73 formed in the upper half 7a and the lower half 7b of the casing 7. A portion of the cavity part 74 in the upper half 7a of the casing 7 constitutes the second region 82. The annular area where the cavity part 74 is formed corresponds, in vertical height, to the position of the inner peripheral surface 7d of the casing 7 where the communication hole 60 is formed. The inner peripheral surface 7d of the casing 7 is formed in the conical region 71 of the casing 7, adjacent to the axially upstream end of the casing 7, at the mid-height of the casing 7 in the vertical direction, compared to the height of the top 7T in the vertical direction, which has the highest height (distance from the center of the rotor 5) in the vertical direction on the radially outer side of the casing 7. In other words, the inner peripheral surface 7d of the casing 7 is formed, on the radially inner side of the combustors 3, at a height in the vertical direction lower than the inner peripheral surface 7c in the vicinity of the top 7T, on the axially upstream side of the top 7T.

Since the cavity part 74 is in contact with a side facing the rotor 5 on the radially inner side of the combustors 3, the ambient air in the cavity part 74 is easily superheated by the preheating of the combustors 3, even after the operation of the gas turbine is stopped. Since the second region 82 is a narrow space surrounded by the combustor 3 and diffuser 9, the ambient air in the stagnation part of the cavity part 74, especially in the cavity part 74 in the upper half 7a of the casing 7, is easily superheated, resulting in a large temperature distribution of the ambient air.

As described above, the diffuser 9 connected to the compressor 2 is disposed on the radially inner side of the cavity part 74. Therefore, when the metal temperature difference increases between the inner peripheral surface 7d of the vertically upper portion of the casing 7 in contact with the cavity part 74 and the inner peripheral surface 7e of the conical region 71 in contact with the cavity part 74 in the lower half 7b of the casing 7, corresponding to the position of the inner peripheral surface 7d, on the opposite (lower) side in the vertical direction with respect to the central axis AX of the rotor 5, the deformation of the casing 7 near the second region 82 increases, and the rotor and the stationary body may come into contact near the last-stage blade 2a of the compressor 2.

The occurrence of the cat-back phenomenon of the casing 7 is not limited to the position with the largest external shape and the highest vertical height in the vicinity of the top 7T of the casing 7. Specifically, as described above, the cat-back phenomenon may also occur near the inner peripheral surface 7d of the casing 7 where the second region 82 is formed and at the mid-height in the vertical direction, and it is necessary to adjust the metal temperature difference in the conical region 71 of the casing 7 at this position to be below a certain temperature. In other words, it is desirable to adjust, at the position of the conical region 71 which is at the mid-height of the casing 7 near the axially upstream end of the turbine casing 6, the metal temperature difference between the inner peripheral surface 7d in the upper half 7a of the casing 7 and the inner peripheral surface 7e (FIG. 2) in the lower half 7b of the casing 7 at the same axial position on the opposite (lower) side in the vertical direction with respect to the central axis AX of the rotor 5 to be below a certain temperature.

The cooling air supplied to the second region 82 through the communication hole 60 impinges on the turning part 73 and diffuses on both sides in the circumferential direction in the cavity part 74 along the turning part 73. In the process of diffusion of the cooling air, the ambient air present in the second region 82 is agitated, and the ambient air stagnant in the stagnation part of the cavity part 74 is diluted, so that the temperature difference of the ambient air in the second region 82 is equalized.

On the other hand, in order to suppress the cat-back phenomenon, in the process of supplying the cooling air from the second supply unit 120 to the casing 7 to agitate and dilute the ambient air in the cavity part 74 of the second region 82, the temperature of the ambient air on the inner peripheral surface 7e in the lower half 7b of the casing 7, which is symmetrically located on the opposite (lower) side in the vertical direction to the inner peripheral surface 7d of the casing 7, remains almost unchanged.

Accordingly, in the process of supplying the cooling air from the second supply unit 120 to the casing 7 to agitate the second region 82 and dilute the ambient air, the temperature distribution of the ambient air in the space of the cavity part 74 of the second region 82 is flattened in the circumferential direction and becomes relatively uniform. Due to the flattening of the temperature distribution in the second region 82, the average temperature of the ambient air in the second region 82 is reduced, and the metal temperature distribution (metal temperature difference) between the inner peripheral surface 7d in the upper half 7a of the casing 7 and the inner peripheral surface 7e in the lower half 7b of the casing 7 is reduced.

As a result, the metal temperature difference between the vertically upper portion of the upper half 7a of the casing 7 and the vertically lower portion of the lower half 7b of the casing 7 in the conical region 71 in contact with the cavity part 74 at the vertical mid-height position of the casing 7 is reduced, and the deformation of the casing 7 at the vertical mid-height position of the casing 7 is suppressed.

Thus, the direction of the cooling air jetted from the second supply unit 120 toward the turning part 73 is changed by the turning part 73 so as to flow in the circumferential direction of the rotor 5, and diffuses in the circumferential direction in the cavity part 74 along the turning part 73. This allows the cooling air to be supplied to a wide area of the second region 82, thus equalizing the metal temperature distribution on the inner peripheral surface 7d of the casing 7 in the second region 82.

Further, in an embodiment shown in FIG. 2, the cooling air can be supplied to a wide area of the second region 82 by using the outer wall surface 75a that forms the manifold 75.

Arrangement of First Supply Unit 110

The arrangement of the first supply unit 110 relative to the casing 7 will be described, with reference to FIGS. 4 to 6. In FIGS. 4 to 6, the outer peripheral surface of the casing 7 with the first supply unit 110 is schematically represented by the circle of long dashed double-dotted line. Further, the combustor 3 and the turning part 73 are also schematically represented by the long dashed double-dotted line.

As shown in FIGS. 4 and 5, the first supply unit 110 may be disposed in an angular range of ±20 degrees in the circumferential direction about the central axis AX of the rotor 5, starting from a vertical plane Sv containing the central axis AX and extending in the vertical direction.

With this configuration, the cooling air can be easily supplied from the first supply unit 110 to an upper area of the first region 81 where hot air tends to accumulate. Thus, it is possible to efficiently reduce the metal temperature difference between upper and lower parts of the casing 7.

When one first supply unit 110 (top supply unit 110A) is disposed in an angular range of ±20 degrees, as shown in FIGS. 4 and 5, the first supply unit 110 may be disposed at the top 7T of the casing 7, which is the 0-degree angular position starting from the vertical plane Sv, or may be disposed at an angular position offset from the top 7T in the circumferential direction of the rotor 5.

As shown in FIGS. 4 to 6, two or more first supply units 110 (side supply units 110B) may be disposed in an angular range of ±90 degrees about the central axis AX of the rotor 5, starting from the vertical plane Sv. For example, in the embodiments shown in FIGS. 4 and 5, three first supply units 110 (one top supply unit 110A and two side supply units 110B) are disposed in an angular range of ±90 degrees. Alternatively, for example, in the embodiment shown in FIG. 6, the first supply units 110 with four nozzles 50 (two top supply units 110A and two side supply units 110B) are disposed in an angular range of ±90 degrees.

Thus, by adjusting the arrangement of the first supply unit 110, it is possible to efficiently supply the cooling air to the entire first region 81, and it is possible to flatten the temperature distribution of the ambient air in the entire first region 81 and the temperature distribution of the metal temperature of the casing 7 in contact with the ambient air.

At least two first supply units 110 (top supply units 110A) may be disposed in an angular range of ±90 degrees in the circumferential direction with respect to the top 7T. For example, in the embodiments shown in FIGS. 4 and 5, the first supply unit 110 (top supply unit 110A) may not be disposed at the 0-degree angular position, which is the position of the top 7T, but may be disposed offset from the 0-degree angular position in the circumferential direction. Alternatively, for example, in the embodiment shown in FIG. 6, the first supply unit 110 (top supply unit 110A) may be further disposed at the 0-degree angular position, which is the position of the top 7T.

As shown in FIGS. 4 to 6, the first supply unit 110 may include at least one pair of first supply units 110 (side supply units 110B) disposed symmetrically about the vertical plane Sv in angular ranges of −90 degrees to −20 degrees and 20 degrees to 90 degrees about the central axis AX of the rotor 5, starting from the vertical plane Sv. For example, in the embodiments shown in FIGS. 4 and 5, one pair of first supply units 110 (side supply units 110B) is disposed in angular ranges of −90 degrees to −20 degrees and 20 degrees to 90 degrees. Alternatively, for example, in the embodiment shown in FIG. 6, one pair of top supply units 110A is disposed in an angular range of ±20 degrees, and one pair of side supply units 110B is disposed in angular ranges of −90 degrees to −20 degrees and 20 degrees to 90 degrees.

This allows the cooling air to be supplied to a wide area of the first region 81, thus suppressing the variation in the temperature difference of the ambient air in the first region 81.

Three or more pairs of first supply units 110 may be disposed in angular ranges of −90 degrees to −20 degrees and 20 degrees to 90 degrees. For example, one pair of top supply units 110A and two pairs or more side supply units 110B may be disposed.

Opening Area of Opening 52 of Nozzle 50

The opening area of the opening 52 of the nozzle 50 or the diameter of the orifice 93 which affects the flow rate of the cooling air discharged from the nozzle 50 will now be described. In this example, as shown in FIGS. 4 and 5, the first supply unit 110 includes a top supply unit 110A disposed at the top 7T of the casing 7 closest to the vertical plane Sv and at least one pair of side supply units 110B disposed on both sides of the top supply unit 110A along the circumferential direction of the rotor 5.

In some embodiments, the nozzle body 51 of the top supply unit 110A has openings 52 such that the sum of the opening areas Sc is greater than the sum of the opening areas Ss of the openings 52 formed in one nozzle body 51 of the at least one pair of side supply units 110B. In other words, the sum Ss of the opening areas of one nozzle body 51 of the side supply units 110B is smaller than the sum Sc of the opening areas of the nozzle body 51 of the top supply unit 110A.

For example, when the diameter of each opening 52 of the nozzle body 51 of the side supply unit 110B is equal to the diameter of each opening 52 of the nozzle body 51 of the top supply unit 110A, the number of openings 52 of one nozzle body 51 of the side supply unit 110B may be less than the number of openings 52 of the nozzle body 51 of the top supply unit 110A. When the number of openings 52 of the nozzle body 51 of the side supply unit 110B is equal to the number of openings 52 of the nozzle body 51 of the top supply unit 110A, the diameter of each opening 52 of one nozzle body 51 of the side supply unit 110B may be smaller than the diameter of each opening 52 of the nozzle body 51 of the top supply unit 110A. The adjustment of the cooling air volume is facilitated by associating the opening area of the nozzle body 51 with the orifice diameter, which will be described later.

The effect of the cooling air distribution to the top supply unit 110A and the side supply unit 110B on the metal temperature distribution in the casing 7 will now be described. FIG. 7 is a diagram showing a relationship between the metal temperature and the mounting position of the first supply unit 110 when one top supply unit 110A is disposed at the top 7T of the casing 7 and one pair of side supply units 110B is disposed on both sides of the top supply unit 110A at circumferentially symmetrical positions. FIG. 8 is a diagram showing a relationship between the metal temperature and the mounting position of the first supply unit 110 when one pair of top supply units 110A is disposed at circumferentially symmetrical positions about the top 7T of the casing 7 and one pair of side supply units 110B is disposed at circumferentially symmetrical positions further away in the circumferential direction from the top supply units 110A. In FIGS. 7 and 8, the solid line indicates an example where the total flow rate of the cooling air discharged from the pair of side supply units 110B is greater than that of the cooling air discharged from the top supply unit 110A or the pair of top supply units 110A (Example 1, Example 11: appropriate cooling). In addition, the long dashed double-dotted line indicates a comparative example where the first supply unit 110 includes only the top supply unit 110A and the cooling air discharged from the top supply unit 110A is supplied only into the casing 7 in the vicinity of the top 7T of the casing 7 (Example 3: top cooling). Further, the dashed line indicates an example where the casing 7 has no means for agitating, diluting, and purging the ambient air in the casing 7, including the first supply unit 110 (Example 2: no casing cooling). The mounting position of each supply unit of the first supply unit 110 is represented by an angle in the clockwise direction based on the bottom QB of the casing 7 (angle 0°) in a cross-section of the casing 7 viewed from the axially upstream side.

In the examples shown in FIG. 7, in the case of no casing cooling indicated by the dashed line in Example 2, the metal temperature is highest at the top 7T of the casing 7 (position 180°). At points P1, P2, Q1, and Q7 of the casing 7, the metal temperature gradually decreases with a distance from the top 7T of the casing 7 in the circumferential direction, and the metal temperature is lowest at the bottom QB of the casing 7 (position 0°). In Example 2, the metal temperature difference between the top 7T of the casing 7 and the bottom QB of the casing 7 is the largest, resulting in the largest casing deformation and the highest likelihood of cat-back. In the case of top cooling indicated by the long dashed double-dotted line in Example 3, since the cooling air is supplied only to the position of the top 7T of the casing 7, the position of the top 7T of the casing 7 is supercooled compared to other circumferential positions, and the metal temperature at the top 7T of the casing 7 has a lower temperature than the metal temperature at the surrounding portion of the casing 7, as indicated by point P3. At points P1 and P2 circumferentially adjacent to the top 7T of the casing 7, the metal temperature at the top 7T of the casing 7 is higher than at point P3. At points further away from the top 7T of the casing 7 in the circumferential direction than points P1 and P2, the metal temperature of the casing 7 gradually decreases. The temperature is lowest at the bottom QB (position 0°) of the casing 7, which is the same as the metal temperature distribution in the case of no top cooling in Example 2. In the case of top cooling in Example 3, the deformation of the casing is smaller than in Example 2, but the metal temperature distribution of the casing 7 in contact with the first region 81, including the top 7T of the casing 7, is still large, and the metal temperature difference between the top 7T and the bottom QB of the casing 7 is not sufficiently small.

On the other hand, in Example 1 indicated by the solid line in FIG. 7, as the first supply unit 110, one top supply unit 110A is disposed at the top 7T of the casing 7, and one pair of side supply units 110B is disposed on both sides of the top 7T of the casing 7 at circumferentially symmetrical separated positions. When the total flow rate of the cooling air discharged from the pair of side supply units 110B is greater than that of the cooling air discharged from the top supply unit 110A, the metal temperature distribution of the casing 7 in contact with the first region 81 is improved compared to the comparative example 1 or example 2. Specifically, in Example 1, the cooling air discharged from the top supply unit 110A and the pair of side supply units 110B is discharged into the casing 7 at points Q2, Q4, and Q6 of the casing 7. The ambient air in the casing 7 at points Q2, Q4, and Q6 of the casing 7 is agitated and diluted, and the metal temperature in the vicinity of points Q2, Q4, and Q6 of the casing 7 is lowered compared to the comparative examples, Example 2 or Example 3. However, the temperature is higher than the metal temperature at point P3 of the casing 7 shown in Example 3 as the comparative example, and the casing is not supercooled as shown in Example 3. Further, the metal temperature at points Q3 and Q5, which are intermediate positions between the supply units (top supply unit 110A and side supply units 110B) in the circumferential direction, is higher than the metal temperature at points Q2, Q4, and Q6, but lower than the metal temperature at the top 7T in the case of no cooling shown in Example 2. In other words, the temperature distribution (temperature variation) of the ambient air in the casing 7 in the vicinity of points Q2, Q3, Q4, Q5, and Q6 in the first region 81 is flattened compared to the comparative examples, Example 2 or Example 3.

In Example 1, although not illustrated in FIG. 7, when the total amount of the cooling air discharged from the top supply unit 110A or the pair of top supply units 110A is the same as the total amount of the cooling air discharged from the pair of side supply units 110B, the metal temperature distribution at points Q2, Q4, and Q6 of the casing 7 is larger than in Example 1, which means that the metal temperature distribution is not sufficiently flattened.

Therefore, in Example 1, the metal temperature distribution of the casing 7 in contact with the first region 81 is flattened compared to the comparative examples shown in Examples 2 and 3, and the deformation of the casing 7 is smaller than in the comparative examples.

FIG. 8 shows the case where the first supply unit 110 includes one pair of top supply units 110A and one pair of side supply units 110B. Specifically, in this example, the pair of top supply units 110A is not disposed at the top 7T of the casing 7 but is slightly displaced to both sides of the top 7T of the casing 7 in the circumferential direction so as to be placed at symmetrical positions (Example 11). The pair of side supply units 110B is disposed at symmetrical positions further away from the top 7T of the casing 7 in the circumferential direction than the top supply units 110A.

In Example 11 shown in FIG. 8, as indicated by the solid line, the first supply unit 110 includes one pair of top supply units 110A disposed in the vicinity of the top 7T of the casing 7 and one pair of side supply units 110B disposed at symmetrical positions further away from the top 7T of the casing 7 in the circumferential direction. When the total amount of the cooling air discharged from the pair of side supply units 110B is greater than that of the cooling air discharged from the pair of top supply units 110A, the metal temperature distribution of the casing 7 in contact with the first region 81 is improved compared to the comparative examples, as with Example 1.

Specifically, in Example 11, the cooling air discharged from the pair of top supply units 110A and the pair of side supply units 110B is supplied at points Q2, Q4, Q6, and Q8 of the casing 7, and the metal temperature at points Q2, Q4, Q6, and Q8 is lowered. However, the temperature is higher than the metal temperature at point P3 shown in Example 3 as the comparative example, and the casing is not supercooled as shown in Example 3. Further, the metal temperature at points Q3, Q5, and Q7, which are intermediate positions between the supply units (top supply units 110A and side supply units 110B) in the circumferential direction, is higher than the metal temperature at points Q2, Q4, Q6, and Q8, but lower than the metal temperature at the top 7T in the case of no cooling shown in Example 2. In other words, the temperature distribution (temperature variation) of the ambient air in the casing 7 in the vicinity of points Q2, Q3, Q4, Q5, Q6, Q7, Q8, and Q9 in the first region 81 is flattened compared to the comparative examples, Example 2 or Example 3. In addition, compared to the metal temperature distribution shown in Example 1, almost the same metal temperature distribution (temperature variation) is obtained.

Therefore, also in Example 11, the metal temperature distribution of the casing 7 in contact with the first region 81 is flattened compared to the comparative examples shown in Examples 2 and 3, and the deformation of the casing 7 is smaller than in the comparative examples.

Arrangement of Second Supply Unit 120

The arrangement of the second supply unit 120 relative to the casing 7 will be described, with reference to FIGS. 4 to 6.

As shown in FIGS. 4 to 6, in the cooling air supply unit 100 according to some embodiments, one or more second supply units 120 are disposed in an angular range of ±20 degrees in the circumferential direction about the central axis AX of the rotor 5, starting from the vertical plane Sv. For example, in the embodiments shown in FIGS. 4 and 6, one second supply unit 120 is disposed in an angular range of ±20 degrees. Alternatively, for example, in the embodiment shown in FIG. 5, two second supply units 120 are disposed in an angular range of ±45 degrees.

With this configuration, the cooling air can be easily supplied from the second supply unit 120 to an upper area of the second region 82 where hot air tends to accumulate. Further, the agitation and dilution of the ambient air in the space along the turning part 73 and the cavity part 74 are promoted, and the temperature distribution of the ambient air in the second region 82 is further flattened. As a result, the metal temperature difference between the vertically upper portion of the upper half 7a and the vertically lower portion of the lower half 7b of the casing 7 in contact with the cavity part 74 at the vertical mid-height position of the casing 7 is reduced, and the deformation at the vertical mid-height position of the casing 7 is suppressed.

When one second supply unit 120 is disposed in an angular range of ±20 degrees, as shown in FIGS. 4 and 6, the second supply unit 120 may be disposed at the 0-degree angular position starting from the vertical plane Sv, or may be disposed at an angular position offset from the 0-degree angular position in the circumferential direction of the rotor 5.

As shown in FIG. 5, in the cooling air supply unit 100 according to some embodiments, two or more second supply units 120 may be disposed in an angular range of ±45 degrees, starting from the vertical plane Sv. For example, in the embodiment shown in FIG. 5, two second supply units 120 are disposed in an angular range of ±45 degrees.

Thus, by adjusting the arrangement of the second supply unit 120, the cooling air can be efficiently supplied to the entire second region 82.

At least two second supply units 120 may be disposed in an angular range of ±45 degrees. For example, in the embodiment shown in FIG. 5, the second supply unit 120 may be further disposed at the 0-degree angular position.

As shown in FIG. 5, in the cooling air supply unit 100 according to some embodiments, the second supply unit 120 may include at least one pair of second supply units 120 disposed symmetrically about the vertical plane Sv in an angular range of ±45 degrees, starting from the vertical plane Sv. For example, in the embodiment shown in FIG. 5, the pair of second supply units 120 is disposed symmetrically about the vertical plane Sv in an angular range of ±45 degrees.

This allows the cooling air to be supplied to a wide area of the second region 82, thus flattening the temperature distribution of the ambient air in the second region 82.

Supply Amount of Cooling Air

A relationship between the supply amount of cooling air from the first supply unit 110 and the supply amount of cooling air from the second supply unit 120 will be described.

In some embodiments, the second supply unit 120 is configured to supply more cooling air than the total amount of cooling air supplied from the first supply units 110.

Specifically, as shown in FIGS. 4 and 6, when only one second supply unit 120 is provided, in some embodiments, the hourly amount of cooling air supplied from the second supply unit 120 to the second region 82 is greater than the sum of the hourly amounts of cooling air supplied from the plurality of first supply units 110 to the first region 81. Alternatively, as shown in FIG. 5, when two second supply units 120 are provided, in some embodiments, the sum of the hourly amounts of cooling air supplied from the two second supply units 120 to the second region 82 is greater than the sum of the hourly amounts of cooling air supplied from the plurality of first supply units 110 to the first region 81.

In order to reduce the metal temperature difference between upper and lower parts of the casing 7, it was found that the amount of cooling air supplied to the second region 82 should be more than the amount of cooling air supplied to the first region 81.

Thus, according to some embodiments, it is possible to effectively reduce the metal temperature difference between upper and lower parts of the casing 7.

In some embodiments, the second supply unit 120 is configured to supply the cooling air to the second region 82 in an amount of 120% to 300% of the total amount of cooling air supplied from the first supply unit 110 to the first region 81.

Specifically, as shown in FIGS. 4 and 6, when only one second supply unit 120 is provided, in some embodiments, the hourly amount of cooling air supplied from the second supply unit 120 to the second region 82 is 120% to 300% of the sum of the hourly amounts of cooling air supplied from the plurality of first supply units 110 to the first region 81. Alternatively, as shown in FIG. 5, when two second supply units 120 are provided, in some embodiments, the sum of hourly amounts of cooling air supplied from the two second supply units 120 to the second region 82 may be 120% to 300% of the sum of the hourly amounts of cooling air supplied from the first supply units 110 to the first region 81.

In order to efficiently reduce the variation in the metal temperature difference between upper and lower parts of the casing 7, it was found that the amount of cooling air supplied to the second region 82 should be 120% to 300% of the amount of cooling air supplied to the first region 81.

Thus, in some embodiments, it is possible to effectively reduce the variation in the metal temperature difference between upper and lower parts of the casing 7.

In some embodiments, a first orifice 93 defining the supply amount of cooling air supplied from the first supply unit 110 to the first region 81 is provided. The first orifice 93 may be disposed at the upstream end of the first associated pipe 92A connected to each nozzle 50. Alternatively, the air supply pipe 91 may be directly connected to each nozzle 50 via a flange portion 91a without the first associated pipe 92A, and the first orifice 93 may be disposed between the nozzle 50 and the flange portion 91a.

Further, in some embodiments, a third orifice 97 defining the supply amount of cooling air supplied from the second supply unit 120 to the second region 82 may be provided. The mounting structure of the third orifice 97 to the casing 7 may be the same as the first orifice 93 and the second orifice 95; i.e., the third orifice 97 may be disposed at the upstream side of the second associated pipe 92B connected to the casing 7, or may be disposed between the casing 7 and the second associated pipe 92B.

As shown in FIGS. 2 and 4 to 6, the first orifice 93 is provided to the first supply unit 110, and is inserted between the air supply pipe 91 and the first associated pipe 92A or the nozzle 50.

As shown in FIGS. 2 and 4 to 6, the third orifice 97 is provided to each second supply unit 120, and is inserted between the air supply pipe 91 and the second associated pipe 92B or the communication hole 60.

With the first orifice 93 and the third orifice 97, it is possible to easily set the amount of cooling air supplied to the first region 81 and the second region 82.

In some embodiments, the sum of the opening areas or the diameters of the third orifices 97 is 120% to 300% of the sum of the opening areas or the diameters of the first orifices.

Specifically, as shown in FIGS. 4 and 6, when only one second supply unit 120 is provided, in some embodiments, the opening area or the diameter of the third orifice 97 of the second supply unit 120 is 120% to 300% of the sum of the opening areas or the diameters of the first orifices 93 provided to the first supply units 110. Alternatively, as shown in FIG. 5, when two second supply units 120 are provided, in some embodiments, the sum of the opening areas or the diameters of the third orifices 97 provided to the second supply units 120 is 120% to 300% of the sum of the opening areas or the diameters of the first orifices 93 provided to the first supply units 110.

As described above, in order to efficiently reduce the metal temperature difference between upper and lower parts of the casing 7, it was found that the amount of cooling air supplied to the second region 82 should be 120% to 300% of the amount of cooling air supplied to the first region 81.

The flow rate of the fluid through the orifice is generally proportional to the opening area or diameter of the orifice.

Therefore, in some embodiments, since the opening area or the diameter of each orifice 93, 95 is set such that the amount of cooling air supplied to the second region 82 is 120% to 300% of the amount of cooling air supplied to the first region 81, the metal temperature difference between upper and lower parts of the casing 7 can be efficiently reduced.

Method for Preventing Deformation of Turbine Casing

The method for preventing deformation of the casing of the gas turbine will now be described with reference to FIG. 9.

The method for preventing deformation of the casing 7 according to an embodiment is used to suppress the cat-back phenomenon when the operation of the gas turbine 1 is stopped. As shown in FIG. 9, the method for preventing deformation of the casing 7 according to an embodiment includes a gas turbine operation stop step S10, a cooling air supply step S20, a first supply unit flow distribution adjustment step S30, and a second supply unit flow distribution adjustment step S40.

As shown in the flowchart of FIG. 9, the gas turbine operation stop step S10 is a step of stopping the operation of the gas turbine 1.

The cooling air supply step S20 is a step of supplying the cooling air from a plurality of cooling air supply units 100 disposed in the upper half 7a of the casing 7 for supplying the cooling air to the interior space 8 of the casing 7, and includes a step of supplying the cooling air to the first region 81 and a step of supplying the cooling air to the second region 82.

The step of supplying the cooling air to the first region 81 is a step of supplying the cooling air from a first supply unit 110, disposed so as to face the first region 81 of the interior space 8 on the radially outer side of the plurality of combustors 3 arranged annularly around the rotor 5 in the casing 7, to the first region 81.

The step of supplying the cooling air to the second region 82 is a step of supplying the cooling air from a second supply unit 120, disposed so as to face the second region 82 of the interior space 8 on the radially inner side of the plurality of combustors 3, to the second region 82.

The first supply unit flow distribution adjustment step S30 is a step of distributing and adjusting the amount of cooling air supplied to the first region 81 from a single or a pair of top supply units 110A and at least one pair of side supply units 110B constituting the first supply unit 110 to an appropriate amount. The single or the pair of top supply units 110A and the at least one side supply unit 110B are disposed at the top 7T of the casing 7 and at positions away from the top 7T in the circumferential direction in the interior space 8 of the casing 7. The top supply unit 110A and the side supply unit 110B are formed so as to include a plurality of nozzles 50 having openings 52 for radially diffusing the cooling air supplied from the outside via the air supply pipe 91 along the inner peripheral surface 7c of the casing 7. Further, a removable orifice for adjusting the amount of cooling air is disposed on the first associated pipe 92A connected to the nozzles 50 on the downstream side of the air supply pipe 91 in the cooling air flow direction. By changing the opening area or the diameter of the orifice (first orifice 93, second orifice 95) disposed on each supply unit, an appropriate cooling air amount is selected. The cooling air is diffused radially through the nozzles 50 to agitate and dilute the ambient air at the top 7T of the casing 7 and in the first region 81 of the interior space 8 extending in the circumferential direction from the top 7T. As shown in FIGS. 7 and 8, by selecting an appropriate cooling air amount, the temperature distribution (temperature variation) of the ambient air at the top 7T of the casing 7 and in the first region 81 of the interior space 8 extending in the circumferential direction from the top 7T is flattened, and the metal temperature distribution of the casing 7 in contact with the first region 81 is also flattened. As a result, the metal temperature difference between the top 7T and the bottom QB of the casing 7 is equalized, the metal temperature difference is reduced, and the deformation amount of the casing 7 is reduced.

As shown in FIG. 9, the first supply unit flow distribution adjustment step S30 further includes a first supply unit metal temperature measurement step S31 of measuring the metal temperature of the casing 7 in the vicinity of the position where the nozzle 50 of the first supply unit 110 is arranged, a first supply unit metal temperature distribution determination step S32 of calculating the temperature distribution of the first supply unit 110 from the measured metal temperature and determining whether the variation in the measured metal temperature is within tolerance; and a first supply unit flow rate adjustment step S33 of, if the metal temperature distribution of the first supply unit 110 is determined to be out of tolerance, changing the opening area or the diameter of the first orifice 93 disposed on the top supply unit 110A of the first supply unit 110 or the second orifice 95 disposed on the side supply unit 110B. It is desirable to adjust the cooling air flow distribution to the top supply unit 110A and the side supply unit 110B constituting the first supply unit 110 such that the total amount of cooling air supplied to the side supply unit 110B is more than the total amount of cooling air supplied to the top supply unit 110A.

By appropriately adjusting the distribution amount of cooling air supplied to the top supply unit 110A and the side supply unit 110B, the metal temperature of the casing 7 in contact with the first region 81 extending in the circumferential direction around the top 7T of the casing 7 is equalized, the metal temperature difference between the top 7T and the bottom QB of the casing 7 is reduced, and the deformation in the circumferential direction in the vicinity of the top 7T of the casing 7 is reduced, so that the occurrence of the cat-back phenomenon is suppressed. The diameter or the opening area of the first orifice 93 and the second orifice 95 may be changed (replaced) for some orifices or for all orifices, depending on the metal temperature distribution of the first supply unit 110.

As shown in FIG. 9, the second supply unit flow distribution adjustment step S40 is a step of selecting and adjusting the second supply unit 120 including one or more communication holes 60 so as to achieve an appropriate flow rate ratio between the amount of cooling air supplied from the first supply unit 110 to the first region 81 and the amount of cooling air supplied from the second supply unit 120 to the second region 82. To this end, the second supply unit flow distribution adjustment step S40 further includes a conical region metal temperature measurement step S41 of measuring the metal temperature of the conical region 71 of the casing 7, a conical region metal temperature distribution determination step S42 of calculating the metal temperature distribution of the conical region 71 from the measured metal temperature of the conical region 71 and determining whether the variation in the metal temperature is within tolerance; and a second supply unit flow rate adjustment step S43 of, if the metal temperature distribution of the conical region 71 is determined to be out of tolerance, changing the opening area or the diameter of the orifice (first orifice 93, second orifice 95) disposed on the first supply unit 110 and the orifice (third orifice 97) disposed on the second supply unit 120.

In the second supply unit flow rate adjustment step S43, it is desirable to adjust the flow rate such that the total amount of cooling air supplied from the second supply unit 120 to the second region 82 is more than the total amount of cooling air supplied from the first supply unit 110 to the first region 81. In particular, when the gap between the combustors 3 arranged annularly around the rotor 5 is small, since the cooling air can be supplied directly from the second supply unit 120 to the second region 82, the temperature distribution of the ambient air in the cavity part 74 extending in the circumferential direction is flattened, the metal temperature distribution between the upper half 7a and lower half 7b of the casing 7 in the conical region 71 is flattened, and the deformation of the casing 7 is reduced. The diameter or the opening area of the first orifice 93, the second orifice 95, and the third orifice 97 may be changed (replaced) for some orifices or for all orifices, depending on the metal temperature distribution of the second supply unit 120.

When the metal temperature distribution of the first region 81 with the first supply unit 110 is determined to be within tolerance in the first supply unit metal temperature distribution determination step S32, and the metal temperature distribution of the conical region 71 in the second region 82 with the second supply unit 120 is determined to be within tolerance in the conical region metal temperature distribution determination step S42, the step of preventing deformation of the turbine casing 6 ends.

According to the method for preventing deformation of the casing according to an embodiment, since the cooling air is supplied from the second supply unit 120 disposed so as to face the second region 82 on the radially inner side of the plurality of combustors 3 to the second region 82, the cooling air can be sufficiently supplied to the second region 82, which may not be supplied with the cooling air sufficiently from the first region 81 on the radially outer side of the plurality of combustors 3. Thus, it is possible to reduce the metal temperature difference between upper and lower parts of the casing 7 and suppress deformation of the turbine casing.

In the method for preventing deformation of the casing according to an embodiment, in the step S23 of supplying the cooling air to the second region 82, more cooling air is supplied to the second region 82 than supplied to the first region 81 in the step S21 of supplying the cooling air to the first region 81.

As described above, in order to reduce the metal temperature difference between upper and lower parts of the casing 7, more cooling air should be supplied to the second region 82 than to the first region 81.

Therefore, with the method for preventing deformation of the casing according to an embodiment, it is possible to effectively reduce the metal temperature difference between upper and lower parts of the casing 7.

The present invention is not limited to the embodiments described above, but includes modifications to the embodiments described above, and embodiments composed of combinations of those embodiments.

For example, when a plurality of first supply units 110 are provided, the position in the direction along the central axis AX of the rotor 5 may be the same for all first supply units 110, or may be different for each first supply unit 110 to the extent that it does not interfere with the suppression of the cat-back phenomenon. Similarly, when a plurality of second supply units 120 are provided, the position in the direction along the central axis AX of the rotor 5 may be the same for all second supply units 120, or may be different for each second supply unit 120 to the extent that it does not interfere with the suppression of the cat-back phenomenon.

REFERENCE SIGNS LIST

1 Gas turbine
2 Compressor
3 Combustor
5 Rotor
6 Turbine casing
7 Casing
7a Upper half
7b Lower half
7c, 7d, 7e Inner peripheral surface
7T Top
8 Interior space
9 Diffuser
21 Compressor casing
50 Nozzle
51 Nozzle body
52 Opening
60 Communication hole
71 Conical region
73 Turning part
74 Cavity part
75 Manifold
81 First region
82 Second region 91 Air supply pipe
92A First associated pipe
92B Second associated pipe
93 First orifice
95 Second orifice
97 Third orifice
100 Cooling air supply unit
110 First supply unit
110A Top supply unit
110B Side supply unit
120 Second supply unit

The invention claimed is:

1. A gas turbine casing, comprising a cooling air supply unit configured to supply a cooling air to an interior space of a casing body of the gas turbine casing,
wherein the cooling air supply unit includes:
a first supply unit disposed in an upper half of the casing body so as to face a first region and configured to supply the cooling air to the first region, where the first region is on a radially outer side of a plurality of combustors arranged annularly around a rotor; and
a second supply unit which includes a communication hole formed in the casing body in a second region on a radially inner side of the plurality of combustors and disposed so as to face the second region and configured to supply the cooling air to the second region,
wherein the casing body includes a turning part supported by the casing body and formed in an annular shape around the rotor on the radially inner side of the plurality of combustors, the turning part being divided into a plurality of segments in a circumferential direction,
wherein the turning part is an outer wall surface that forms a manifold for supplying the cooling air to the rotor,
wherein a portion of the turning part is disposed so as to face the communication hole of the second supply unit, and
wherein the second supply unit is angled toward the turning part and configured to jet the cooling air directly toward the turning part.

2. The gas turbine casing according to claim 1,
wherein the casing body includes a cavity part surrounded by the turning part and an inner wall surface of the casing body that faces the turning part, the cavity part being formed in an annular shape extending in the circumferential direction along the turning part.

3. The gas turbine casing according to claim 1,
wherein the first supply unit includes a plurality of nozzles, and
wherein the first supply unit includes:
a top supply unit disposed in a top of the upper half of the casing body; and
at least one pair of side supply units disposed adjacent to the top supply unit in the circumferential direction and away from the top of the upper half of the casing body.

4. The gas turbine casing according to claim 3,
wherein the top supply unit includes one nozzle of the plurality of nozzles disposed at the top of the upper half of the casing body, and the at least one pair of side supply units is disposed at circumferentially symmetrical positions about a vertical plane containing a central axis of the rotor.

5. The gas turbine casing according to claim 3,
wherein the top supply unit includes two or more nozzles of the plurality of nozzles, and
wherein the two or more nozzles are disposed at the top of the upper half of the casing body at circumferentially symmetrical positions on both sides of the top of the upper half of the casing body about a vertical plane containing a central axis of the rotor.

6. The gas turbine casing according to claim 5,
wherein the at least one pair of side supply units includes two or more nozzles of the plurality of nozzles disposed in an angular range of ±90 degrees in the circumferential direction with respect to the vertical plane.

7. The gas turbine casing according to claim 3,
wherein the first supply unit includes a first associated pipe for supplying the cooling air to the plurality of nozzles,
wherein the first associated pipe includes:
a first orifice defining a supply amount of the cooling air supplied to the top supply unit and disposed upstream of the top supply unit; and
a plurality of second orifices, each second orifice defining a supply amount of the cooling air supplied to a respective one of the side supply units and being disposed upstream of the respective one of the side supply units, and
wherein a total value of an opening area or a diameter of the first orifice is smaller than a total value of an opening area or a diameter of the second orifices.

8. The gas turbine casing according to claim 3,
wherein the top supply unit or each side supply unit has a cylindrical nozzle body, and
wherein the nozzle body has a plurality of openings along a circumference of the nozzle body on a side of the nozzle body, the plurality of openings connecting an inside of the nozzle body and the first region.

9. The gas turbine casing according to claim 1,
wherein the first supply unit includes a plurality of nozzles,
wherein the first supply unit includes:
a top supply unit disposed in a top of the upper half of the casing body; and
at least one pair of side supply units disposed adjacent to the top supply unit in the circumferential direction and away from the top of the upper half of the casing body,
wherein the first supply unit includes a first associated pipe for supplying the cooling air to the plurality of nozzles,
wherein the first associated pipe includes:
a first orifice defining a supply amount of the cooling air supplied to the top supply unit and disposed upstream of the top supply unit; and
a plurality of second orifices, each second orifice defining a supply amount of the cooling air supplied to a respective one of the side supply units and being disposed upstream of the respective one of the side supply units,
wherein a total value of an opening area or a diameter of the first orifice is smaller than a total value of an opening area or a diameter of the second orifices,
wherein the second supply unit includes:
a second associated pipe fixed to the casing body and connected to the communication hole; and
a third orifice defining a supply amount of the cooling air supplied to the second supply unit and disposed upstream of the second associated pipe, and wherein a total value of an opening area or a diameter of the third orifice is larger than a total value of an opening area or a diameter of the first orifice and the second orifices.

10. The gas turbine casing according to claim 9, wherein the communication hole is one of a pair of communication holes disposed at circumferentially symmetrical positions about a vertical plane containing a central axis of the rotor.

11. The gas turbine casing according to claim 1, wherein the second supply unit is disposed in an angular range of ±20 degrees in the circumferential direction with respect to a vertical plane containing a central axis of the rotor.

12. A gas turbine, comprising:
the rotor;
the plurality of combustors; and
the gas turbine casing according to claim 1.

* * * * *